(12) United States Patent
Marechal (10) Patent No.: US 7,055,954 B2
(45) Date of Patent: Jun. 6, 2006

(54) SCRATCH MASKING COATINGS FOR OPTICAL SUBSTRATES

(75) Inventor: Nadine Genevieve Marechal, Glenelg North (AU)

(73) Assignee: Sola International Holdings Ltd., Lonsdale (AU)

(*) Notice: Subject to any disclaimer, the term of this patent is extended or adjusted under 35 U.S.C. 154(b) by 0 days.

(21) Appl. No.: 10/485,665

(22) PCT Filed: Aug. 2, 2002

(86) PCT No.: PCT/AU02/01035

§ 371 (c)(1),
(2), (4) Date: Feb. 2, 2004

(87) PCT Pub. No.: WO03/014776

PCT Pub. Date: Feb. 20, 2003

(65) Prior Publication Data

US 2004/0191682 A1    Sep. 30, 2004

(30) Foreign Application Priority Data

Aug. 3, 2001  (AU) .................... PR6787

(51) Int. Cl.
   *G02C 7/02*    (2006.01)
(52) U.S. Cl. ............... 351/159; 351/165; 351/163; 359/634

(58) Field of Classification Search ......... 351/159, 351/162, 163, 165; 359/490, 634, 618
See application file for complete search history.

(56) References Cited

U.S. PATENT DOCUMENTS

| | | | | |
|---|---|---|---|---|
| 6,077,569 | A * | 6/2000 | Knapp et al. | 427/534 |
| 6,569,517 | B1 * | 5/2003 | McGurran et al. | 428/323 |
| 6,848,797 | B1 * | 2/2005 | Gillich et al. | 359/883 |
| 6,852,406 | B1 * | 2/2005 | Marechal et al. | 428/336 |

FOREIGN PATENT DOCUMENTS

| | | |
|---|---|---|
| JP | 62-239103 | 10/1987 |
| JP | 10-170709 | 6/1998 |
| JP | 10-291269 | 11/1998 |

OTHER PUBLICATIONS

Hunter et al., "The Measurement of Appearance", Second Edition, 1987, pp. 145-148, 177-180, Wiley, New York, New York.

* cited by examiner

*Primary Examiner*—Jordan M. Schwartz
*Assistant Examiner*—Jessica Stultz
(74) *Attorney, Agent, or Firm*—Buchanan Ingersoll PC (57) ABSTRACT

This invention relates to a reflective coating for a surface of an optical substrate, the reflective coating including a plurality of layers of alternating higher and lower refractive index, the thickness and/or number of the layers selected to cause the reflective coating to be scratch masking.

96 Claims, 6 Drawing Sheets

Two layer metallic mirror coating​ ​ ​ ​ Scratch masking Sky Blue coating

SCRATCH MASKING COATINGS FOR OPTICAL SUBSTRATES

This application claims priority to PCT Application No. PCT/AU02/01035, filed on Aug. 2, 2002, now International Publication No. WO 03/014776 A1, published Feb. 20, 2003, which claims priority to Australian Patent No. PR6787, filed Aug. 3, 2001.

FIELD OF THE INVENTION

The present invention relates to scratch masking coatings on optical substrates, together with methods of forming such scratch masking coatings on optical substrates. The present invention also relates to optical substrates having such scratch masking coatings thereon.

It will become apparent from the following description that the optical substrates are most likely to be optical articles such as ophthalmic lenses, and sunglass lenses in particular. However, it must be appreciated that the invention is not to be limited in its application to only those optical substrates.

BACKGROUND OF THE INVENTION

Coatings are generally applied to optical substrates so as to impart some desired optical characteristic to the optical substrate. For example, an anti-reflection coating might be applied to a surface of an ophthalmic lens so as to reduce parasitic reflections that interfere with the vision of the wearer. Such a coating serves to increase the transmission of light through to the wearer and improve the visibility of the wearer's eyes to others. Another example of a coating used to impart a desired optical characteristic to an optical substrate is that of mirror (reflective) coatings. Such coatings might be applied to a surface of an ophthalmic lens so as to improve the contrast of viewed images for the wearer, as well as to provide a reduction in transmitted ultra-violet or infra red light. Mirror coatings may also impart a coloured appearance to the optical substrate, which may be desirable for aesthetic purposes.

Coatings may also be used to provide an improved physical property to a surface of an optical substrate. For example, abrasion resistant coatings might be applied to a surface of an ophthalmic lens so as to improve the resistance of the surface to mechanical damage, such as scratching.

Scratching of a surface of an ophthalmic lens not only interferes with the vision of the wearer, but it may also result in an article that is less appealing aesthetically. This is particularly the case for lenses that have a mirror coating applied to them. Mirror coatings generally have poor abrasion resistance and as such are easily damaged.

A particular deficiency of mirror coatings is that when scratched, the scratches are highly visible due to the colour contrast between the scratches and the mirror coating. The most dramatic example of such a loss in visual appeal is observed with blue mirror coatings. When scratched, such mirror coatings exhibit highly visible purple, pink and yellow scratches. The visibility of the scratches is due to the difference in colour and brightness between the light reflected from the undamaged surface of the mirror coating and the light reflected from the scratch on the surface of the mirror coating.

Mirror coatings are most often applied to the surface of abrasion resistant coatings such as hardcoat layers. However, although the abrasion resistant coating may provide resistance to mechanical damage to the optical substrate, the mirror coating itself may still be easily damaged. Consequently, any damage to the optical substrate will first occur to the surface of the mirror coating, resulting in a reduction in the quality of the vision of the wearer and an optical substrate that has less aesthetic appeal.

A deficiency in the prior art has been the inability to formulate a coating that provides a reduction in the visibility of scratches on the surface of an optical substrate, and in particular, the inability to formulate mirror coatings that provide a reduction in the visibility of scratches on the surface of an optical substrate. It is also desirable to provide a coating with improved resistance to scratching, as compared to the resistance to scratching of other similar coatings that when damaged show highly visible scratches.

SUMMARY OF THE INVENTION

The present invention provides a reflective coating for a surface of an optical substrate, the reflective coating including a plurality of layers of alternating higher and lower refractive index, the thickness and/or number of layers selected to cause the coating to be scratch masking.

The present invention also provides an optical substrate having a reflective coating on a surface thereof, the reflective coating including a plurality of layers of alternating higher and lower refractive index, the thickness and/or number of the layers selected to cause the coating to be scratch masking.

The present invention further provides a method for forming a reflective coating on a surface of an optical substrate, the method including the step of depositing a reflective coating including a plurality of layers of alternating higher and lower refractive index, the thickness and/or number of the layers selected to cause the reflective coating to be scratch masking.

The present invention arises out of studies into the highly visible nature of scratches to reflective coatings. It has been found that reflective coatings may be produced that are scratch masking by selecting a coating so that the intensity and colour of the light reflected from the surface of the optical substrate do not change substantially with changes in the thickness of the coating. Such a coating is said to be "scratch masking".

In particular, it has been found that for a reflective coating including a plurality of layers of alternating higher and lower refractive index, the thickness and/or number of layers may be selected to cause the reflective coating to be scratch masking.

Various terms that will be used throughout the specification have meanings that will be well understood by a skilled addressee. However, for ease of reference, some of these terms will now be defined.

The term "reflective coating" as used throughout the specification is to be understood to mean any coating applied to the surface of an optical substrate which functions to reflect a proportion of the incident light thereon. An example of a reflective coating is that commonly referred to in the art as a "mirror coating". It is also to be understood that the term "reflective coating" as used throughout the specification means a coating that may consist of more than one layer.

The term "optical substrate" as used throughout the specification is to be understood to mean any substrate that has the capacity to transmit or reflect light and that may require a reflective coating that is able to reduce the visibility of scratches on a surface of the substrate. The term not only includes optical articles such as ophthalmic lenses and sunglass lenses, but any other type of article that may require a reflective coating that has the capability to reduce the visibility of scratches. For instance, the optical substrate may include any transparent or opaque surface to which a decorative coating may be applied. Where the optical substrate is an optical article such as an ophthalmic lens, the lens may be formed from a variety of different lens materials, including glass, and particularly a number of different polymeric plastic resins. A common material is diethylene glycol bis (allyl carbonate) or CR39 (PPG Industries). Other suitable materials are acrylics, allylics, styrenics, polycarbonates, vinylics, polyesters and the like.

The term "scratches" as used throughout the specification is to be understood to mean any physical damage to the surface of an optical substrate that results in a difference in the colour and/or brightness of light reflected from the damaged surface as compared to the light reflected from the undamaged surface of the optical substrate.

An optical substrate is said to be "scratch masked" by a coating in accordance with the various forms of the present invention when the reflectance from the coating does not vary substantially in colour when the coating is scratched.

BRIEF DESCRIPTION OF THE FIGURES

FIG. 1a represents a simulated plot of reflectance as a function of the light wavelength. FIG. 1b represents a simulated plot of colour variation with scratch depth in the CIE 1931 colour space, each point representing a 10 nm step increment in the scratch depth. FIG. 1c represents a simulated plot of colour variation with scratch depth using the $\Delta E(CMC\ 2:1)$ formula, as a function of the scratch depth.

FIG. 2a represents a simulated plot of colour variation with scratch depth in the CIE 1931 colour space, each point representing a 10 nm step increment in the scratch depth. FIG. 2b represents a simulated plot using $\Delta E(CMC\ 2:1)$ formula, as a function of the scratch depth.

FIG. 3a represents a simulated plot of colour variation with scratch depth in the CIE 1931 colour space, each point representing a 10 nm step increment in the scratch depth. FIG. 3b represents a simulated plot of colour variation using $\Delta E(CMC\ 2:1)$ formula, as a function of the scratch depth.

FIG. 4a represents a simulated plot of colour variation with scratch depth in the CIE 1931 colour space, each point representing a 10 nm step increment in the scratch depth. FIG. 4b represents a simulated plot of colour variation using $\Delta E(CMC\ 2:1)$ formula, as a function of the scratch depth.

FIG. 5a represents a simulated plot of colour variation with scratch depth in the CIE 1931 colour space, each point representing a 10 nm step increment in the scratch depth. FIG. 5b represents a simulated plot of colour variation with scratch depth using $\Delta E(CMC\ 2:1)$ formula, as a function of the scratch depth.

GENERAL DESCRIPTION OF THE INVENTION

As mentioned above, in one form the present invention provides a reflective coating for a surface of an optical substrate, the reflective coating including a plurality of layers of alternating higher and lower refractive index, the thickness and/or number of the layers selected to cause the reflective coating to be scratch masking.

As discussed previously, scratches to mirror coatings are highly visible because the intensity and colour of the light reflected from a scratch varies from the light normally reflected from the surface of the coating.

In this regard, it will be appreciated that many coatings, particularly those applied to optical substrates, consist of more than one optically transparent layer. A scratch to such a coating may be considered to represent a situation where the light is incident to a surface in which a part (the scratch) of the top layer of the coating is of reduced thickness. A change in the thickness of the top layer, as occurs when the coating is damaged, may affect the colour and intensity of the light reflected from the surface of the coating. This change in the colour and intensity of the light may be understood as resulting from a variation in interference recombination.

The colour and intensity of light reflected from a coating consisting of more than one optical layer will therefore depend on a number of factors, including the wavelength (colour) of the incident light, the number and thickness of the optical layers, and the refractive indices of the respective layers. A change in the thickness of any of the layers, as occurs when the surface is scratched, may result in a change in the intensity and colour of the reflected light from the coating.

The scratch masking properties of the reflective coating of the present invention may be obtained by selecting a coating so that the intensity and colour of the light reflected from the surface of the optical substrate do not change substantially with changes in the thickness of the coating.

To provide a reflective coating that is scratch masking, the number of layers, the refractive index of each layer and/or the thickness of each layer are selected so that the intensity and colour of the light reflected from the coating do not change substantially as the thickness of the coating changes. In particular, to provide a reflective coating that is scratch masking, the reflective coating includes a plurality of layers of alternating higher and lower refractive index, the thickness and/or number of layers selected so as to cause the coating to be scratch masking.

An optical substrate is said to be "scratch masked" by a reflective coating in accordance with the various forms of the present invention when the reflectance from the coating does not vary substantially in colour when the coating is scratched. Preferably, the optical substrate to which the reflective coating is applied is an ophthalmic lens or a sunglass lens.

In determining whether this requirement is met, it should be noted that as scratches are typically not deeper than about 50 nm, scratches up to this depth should be masked by the coating of the present invention. However, in some embodiments of the present invention, scratches with a greater depth may also be masked such that the reflectance from the coating does not vary substantially in colour. In this respect, the broadest threshold for what is considered by the applicant to be an insubstantial variation in colour is represented by a reflected colour shift ($\Delta E$) of 11 or less. More preferably, the threshold is represented by a reflected colour shift ($\Delta E$) of 6 or less.

In relation to the parameter referred to as "a reflected colour shift (ΔE)", the visual appearance of coated optical articles in reflected light can be quantified by measuring the reflectance spectrum in a spectrophotometer. This spectral information may be reduced to three colour coordinates—a "lightness" corresponding primarily to the luminous intensity of the reflected light, and two chromatic attributes, the "hue" and "chroma" corresponding to the general colour (eg. red, blue, green etc.) and its vividness, as detailed in "The Measurement of Appearance", $2^{nd}$ ed., R. S. Hunter and R. W. Harold, Wiley, N.Y., 1987. The term "colour" as used here refers to all three coordinates. Perceived variations in appearance may thus be quantified by calculating colour differences or shifts, such as a "CMC colour difference" as developed by the Colour Measurement Committee of the Society of Dyers and Colourists. In this respect, a reflected colour shift of, for example, $\Delta E_{CMC(2:1)}=1$ (which is the limit of acceptability for textiles), has been found by the applicant to be too stringent a tolerance for reflective coatings. Indeed, and as mentioned above, the applicant has observed that reflected colour shifts (ΔE) of up to 11 occurring when a mirror coated lens is scratched are quite acceptable. Preferably, the reflected colour shift (ΔE) of the reflective coating when scratched is 6 or less.

An alternative method of assessing whether a reflective coating is scratch masking in accordance with the present invention is to determine whether the colour of the light reflected from a damaged coating varies substantially from the light reflected from the undamaged coating using the CIE 1931 system of colour specification.

The CIE 1931 system of colour specification allows a given colour to be specified by the amounts of three primary colours required to match the colour. In this way, a colour can be designated a position in a three dimensional plot where each of the primary colours represents an axis. Any given colour may therefore occupy a particular position in three dimensional colour space. However, for ease of representation, the three dimensional colour space can be mathematically transformed into a two dimensional graphical representation. In this way, the three primary colours that specify a given colour can be transformed into chromaticity coordinates, x and y, and any given colour will occupy a specific position in a chromaticity diagram.

In terms of a chromaticity diagram, a coating will be said to be "scratch masking", and thus, be in accordance with the present invention, if there is not a substantial change in the position in the chromaticity coordinates when the coating is scratched. In particular, the variation in colour for a scratch masking coating when scratched will be less than the variation shown for an equivalent non-scratch masking coating. By an equivalent non-scratch masking coating is meant an undamaged coating that has similar colour attributes to the undamaged scratch masking coating. Therefore, for the coatings to be equivalent, the scratch masking coating and the non-scratch masking coating will, before being scratched, occupy similar positions in a chromaticity diagram.

Accordingly, in a preferred form the present invention provides a reflective coating for which the variation in the chromaticity coordinates of the light reflected from the reflective coating when scratched is substantially unchanged.

The lower and higher refractive index layers of the reflective coating in the various forms of the present invention may be formed from any optically suitable material, such as from one or more optically suitable dielectric materials. Preferably, the optically suitable dielectric material is a metal oxide, a metal fluoride, a metal nitride or a diamond-like carbon. More preferably, the dielectric material is selected from one or more of the group consisting of $Al_2O_3$, $BaTiO_3$, $Bi_2O_3$, $CeO_2$, $Cr_2O_3$, $Ga_2O_3$, $GeO_2$, $Fe_2O_3$, $HfO_2$, $In_2O_3$, indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $Ti_2O_3$, $Ti_3O_5$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF$, $NaF$, $Na_3AlF_6$, $Na_5Al_3F_6$, $NdF_3$, $PbF_2$, $PrF_3$, $SrF_2$, $ThF_4$, $ZrF_4$, $Si_3N_4$, $AlN$. Polymeric materials or dielectric materials that include dopants of metal compounds may also be used.

In a particularly preferred form, the lower refractive index layer(s) include a silica ($SiO_2$), and the higher refractive index layer(s) include titanium dioxide ($TiO_2$) or a combination of titanium dioxide ($TiO_2$) and a praseodymium oxide ($Pr_2O_3$).

By a lower refractive index layer in accordance with the various forms of the present invention is meant a layer with refractive index in the range from 1.40 to 1.50. Preferably, the refractive index of a lower refractive index layer(s) is 1.45.

By a higher refractive index layer in accordance with the present invention is meant a layer with a refractive index in the range from 1.90 to 2.50. Preferably, the refractive index of a higher refractive layer(s) is 2.09.

The scratch masking coating in the various forms of the present invention includes a plurality of layers. Preferably, the scratch masking coating includes 4 or more layers. Most preferably, the scratch masking coating consists of 4 or 5 layers of alternating higher and lower refractive index.

The thickness of the layers of the alternating layers of higher and lower refractive index in the various forms of the present invention is not particularly limited, so long as the thickness is selected to cause the reflective coating to be scratch masking. In this regard, it should be noted that the thickness of the top layer of the coating does not necessarily correlate with the scratch masking properties of the coating. Top layers which are thinner than the scratch depth may still be scratch masking.

An optical substrate with a coating in accordance with the present invention may also include one or more additional coatings. Such an additional coating may underlie the scratch masking coating. Examples of such a coating that may underlie the scratch masking coating include impact resistant coatings, abrasion resistant coatings, and adhesion promoting coatings. Preferably, the additional coating is an abrasion resistant coating.

The abrasion resistant coating in the various forms of the present invention may be of any suitable type, but an abrasion resistant coating including siloxane resin with colloidal silica dispersion is preferred. Abrasion resistant layers may be applied by techniques such as chemical vapour deposition (CVD). Preferably the hardcoat may be applied by low temperature plasma enhanced CVD.

Other coatings may also be applied onto the scratch masking coating to impart a desired surface property to the optical article. Preferably, such other coatings are very thin, with a thickness of 5 nm being most preferred. A preferred coating that may be applied onto the scratch masking coating is a hydrophobic coating. Preferably, the hydrophobic coating includes a fluorine polysilazane.

Other fluorinated coatings with hydrophobic and/or oleophobic properties may also be used in conjunction with the scratch masking coating. Hydrophilic coatings such as antifog coatings may also be used in conjunction with the scratch masking coatings. Preferably these additional coatings overlie the scratch masking coating.

The use of both an abrasion resistant coating underlying the scratch masking coating and a hydrophobic coating over the scratch masking is particularly preferred.

Further, a surface of the optical substrate may be subjected to a surface treatment to improve bondability and/or compatability of the scratch masking coating and any additional coating(s). The surface treatment may be selected from one or more of the group consisting of plasma radiation, UV radiation, flame treatment, ion pre-cleaning and laser treatment, including excimer laser treatment.

The layers of the scratch masking coating may be deposited by any suitable means. For example, the layers may be deposited via vacuum deposition, by physical vapour deposition (PVD) using evaporation with or without ion-assistance or by sputtering. Alternatively, the layers may be deposited by chemical vapour deposition (CVD). Preferably, the layers of the scratch masking coating will be deposited by physical vapour deposition.

It has also been determined that reflective coatings in accordance with the present invention show improved resistance to abrasion as compared to a non-scratch masking coating with similar reflectance and colour characteristics.

The abrasion resistance of the reflective coating may be determined by a suitable method known in the art. For example, the abrasion resistance of a reflective coating in accordance with the present invention may be determined by subjecting an optical substrate with a reflective coating thereon to 75 cycles of a Steel Wool test. As will be appreciated, the comparative coating will be applied on a similar lens, with a similar hardcoat and it will have similar reflectance (R) and colour characteristics (x and y) to the scratch masking coating as determined using the CIE 1931 system of colour specification.

The present invention also contemplates optical substrates having scratch masking reflective coatings as discussed above on one or more surfaces of the optical substrate. Accordingly, in a preferred form the present invention provides an optical substrate having a reflective coating on a surface thereof, the reflective coating including a plurality of layers of alternating higher and lower refractive index, the thickness and/or number of the layers selected to cause the coating to be scratch masking.

The present invention further contemplates methods for forming a scratch masking reflective coating as discussed above on a surface of an optical substrate. Accordingly, in another preferred form, the present invention provides a method for forming a reflective coating on a surface of an optical substrate, the method including the step of depositing a reflective coating including a plurality of layers of alternating higher and lower refractive index, the thickness and/or number of the layers selected to cause the reflective coating to be scratch masking.

DESCRIPTION OF PREFERRED EMBODIMENTS

The present invention will now be described in relation to various examples of preferred embodiments. However, it must be appreciated that the following description is not to limit the generality of the above description.

EXAMPLE 1

Table 1 illustrates an example of a scratch resistant, night blue reflective (mirror) coating and two comparative coatings with similar reflectance and colour characteristics (as determined using the CIE 1931 colour system). The first comparative coating is a two layer metallic coating. The second comparative coating is a five layer dielectric coating.

The properties of each of the coatings is as calculated using the commercial software package Tfcalc (Thin Film Design software by Software Spectra Inc, Portland Oreg., USA).

TABLE 1

| Thickness (nm) | 2 layer metallic | 5 layer dielectric | Scratch - masking |
|---|---|---|---|
| Cr | 5 | 0 | 0 |
| $SiO_2$ | 295 | 242 | 0 |
| Material with n = 2.09@550 nm | 0 | 50 | 37 |
| $SiO_2$ | 0 | 51 | 57 |
| Material with n = 2.09@550 nm | 0 | 32 | 178 |
| Top $SiO_2$ | 0 | 20 | 317 |
| R (%) | 10.6 | 9.9 | 9.9 |
| x (CIE1931) | 0.213 | 0.201 | 0.201 |
| y (CIE 1931) | 0.203 | 0.167 | 0.169 |

The term "R" represents the predicted percentage luminosity of the light reflected from the coating. Values x and y represent predicted chromaticity coordinates of the reflected light according to the CIE 1931 system of colour specification.

Figure 1:
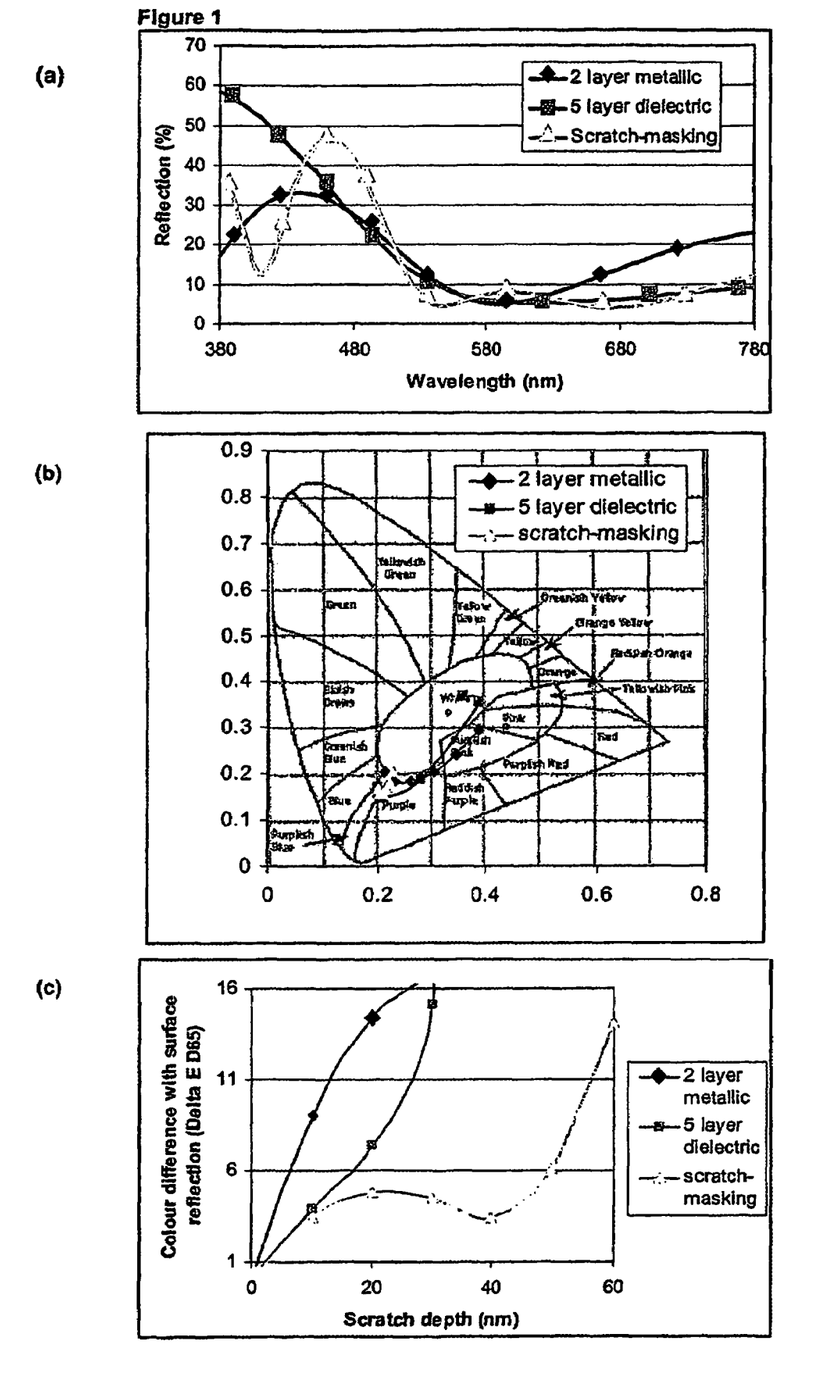
FIG. 1 illustrates the properties of scratch masking coatings as described in Example 1.

As can be seen from a plot of the calculated reflectance of each of these coatings as a function of the wavelength of incident light, as shown in FIG. 1a, the three mirror coatings all have approximately the same luminous reflectance.

Superficial scratches of a predetermined depth (nm) were simulated by reducing the thickness of the top layer for each of the described coatings. The resulting reflectance was compared to that of the unscratched surface for each coating. The colour variation as a function of scratch depth is shown in FIG. 1b, where the colour coordinates of the mirror reflection colour are reported in the CIE 1931 colour space, starting from blue (x=0.2, 0.17<y<0.20), each point representing a 10 nm step increment in the scratch depth.

As can be seen from FIG. 1b, scratches on the two layer and five layer comparative coatings show a transition from purplish blue to purplish pink with increasing scratch depth. As the scratch depth approaches 50 nm, the scratches appear white. Both comparative coatings show a substantial variation in colour with increasing scratch depth.

However, to the contrary, for the scratch masking coating the scratches appear purplish blue over the range of depths from 0 to 50 nm This results in the visibility of the scratches being reduced as compared to the comparative two layer and five layer coatings. The variation in the colour for the scratch masking coating with increasing scratch depth is minimal, and the variation is substantially reduced as compared to both of the comparative coatings.

The data of FIG. 1b does not include information on the brightness of colour. To illustrate the colour variation more realistically, the colour difference was calculated using $\Delta E(CMC\ 2:1)$ formula for a D65 (daylight) illuminant. This system provides a further measure of the ability of the coating to reduce the visibility of scratches. FIG. 1c shows the $\Delta E$ values for scratches of differing depths for the scratch masking coating and the comparative two layer and comparative five layer coatings. Colour variations ($\Delta E$) up to a value of 6 are barely noticeable, and colour variations up to 11 are acceptable. As can be seen, scratches of 20 nm in depth or greater had $\Delta E$ values greater than 11 for the comparative two layer coating. For the comparative five layer coating, scratches greater than 20 nm in depth showed $\Delta E$ values approaching the limit of acceptability. However, the scratch masking coating showed ΔE values of 6 or less for scratches up to and including a depth of 50 nm.

EXAMPLE 2

Table 2 illustrates an example of a scratch resistant, sky blue reflective (mirror) coating and two comparative coatings with similar reflectance and colour characteristics (as determined using the CIE 1931 system of colour specification). The first comparative coating is a two layer metallic coating. The second comparative coating is a five layer dielectric coating.

The properties of each of the coatings is as calculated using the commercial software package Tfcalc (Thin Film Design software by Software Spectra Inc, Portland Oreg., USA).

TABLE 2

| Thickness (nm) | 2 layer metallic | 5 layer dielectric | Scratch - masking |
|---|---|---|---|
| Cr | 5 | 0 | 0 |
| $SiO_2$ | 100 | 73 | 48.2 |
| Material with n = 2.09 @ 550 nm | 0 | 39.9 | 164.8 |
| $SiO_2$ | 0 | 75.3 | 117.3 |
| Material with N = 2.09 @ 550 nm | 0 | 14.6 | 146.6 |
| Top $SiO_2$ | 0 | 69 | 327.7 |
| R (%) | 7.6 | 14.4 | 14.4 |
| x (CIE1931) | 0.235 | 0.230 | 0.230 |
| y (CIE 1931) | 0.223 | 0.249 | 0.250 |

The term "R" represents the predicted percentage luminosity of the light reflected from the coating. Values x and y represent predicted chromaticity coordinates of the reflected light according to the CIE 1931 system of colour specification.

Superficial scratches of a predetermined depth (nm) were simulated by reducing the thickness of the top layer for the scratch masking coating and both comparative coatings. The resulting reflectance was compared to that of the unscratched surface for each coating. The colour variation as a function of scratch depth is shown in FIG. 2a, where the colour coordinates of the mirror reflection colour are reported in the CIE 1931 colour space, starting from light blue (x=0.23, 0.22<y<0.25), each point representing a 10 nm step increment in the scratch depth.

Figure 2:
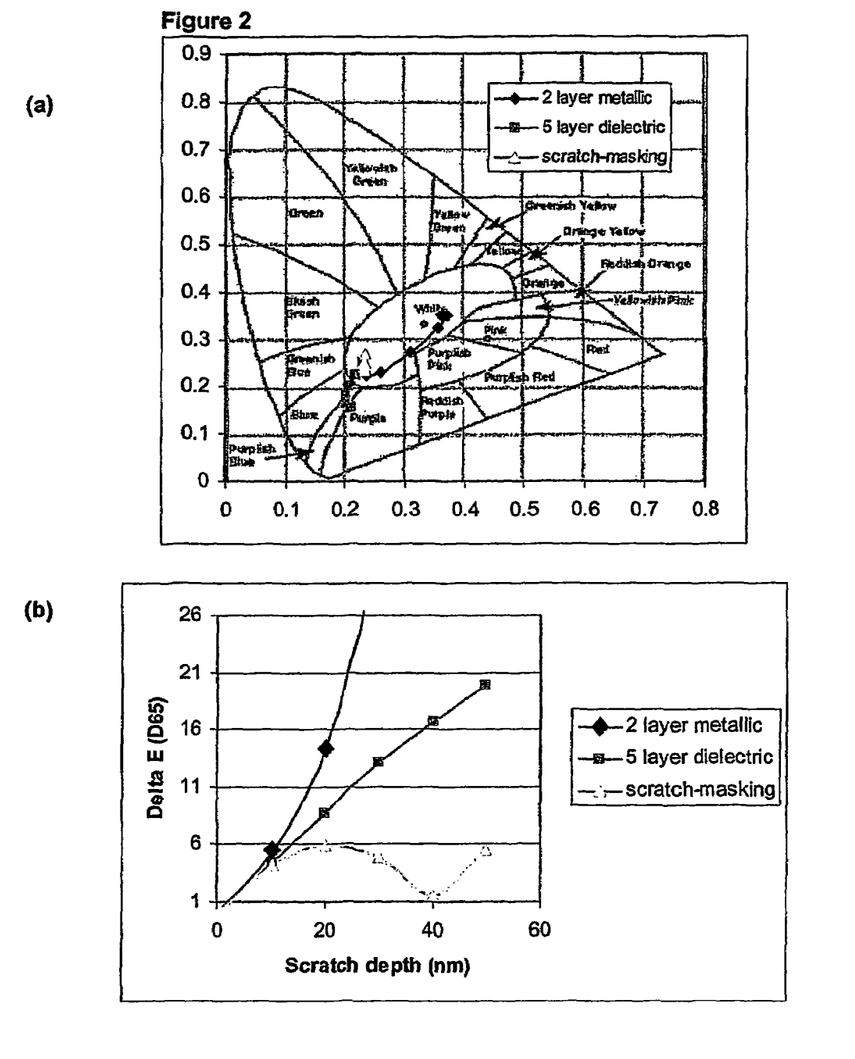
FIG. 2 illustrates the properties of scratch masking coatings as described in Example 2.

As can be seen from FIG. 2a, scratches on the two layer comparative coating show a transition from blue to white with increasing scratch depth. The five layer comparative coating shows a transition from blue to purple with increasing scratch depth. Both comparative coatings show a substantial variation in colour with increasing scratch depth.

However, to the contrary, the scratch masking coating does not show a change in the colour of the coating with increasing scratch depth, with the sky blue coating remaining light blue. This results in the visibility of the scratches being reduced as compared to the two layer and five layer comparative coatings. The variation in the colour for the scratch masking coating with increasing scratch depth is minimal, and substantially reduced as compared to both of the comparative coatings.

The data of FIG. 2b does not include information on the brightness of colour, To illustrate the colour difference more realistically, the colour difference was calculated using ΔE(CMC 2:1) formula for a D65 (daylight) illuminant. This system provides a further measure of the ability of the coating to reduce the visibility of scratches. FIG. 2b shows the ΔE values for scratches of differing depths for the scratch masking coating and the comparative two layer and comparative five layer coatings. Colour variations (ΔE) up to a value of 6 are barely noticeable, and colour variations up to 11 are acceptable. As can be seen, scratches of 20 nm in depth or greater had ΔE values greater than 11 for the comparative two layer coating. For the comparative five layer coating, scratches greater than 20 nm in depth showed ΔE values approaching the limit of acceptability. However, the scratch masking coating showed ΔE values of 6 or less for scratches up to and including a depth of 50 nm.

EXAMPLE 3

Table 3 illustrates an example of a scratch resistant, black reflective (mirror) coating and two comparative coatings with similar reflectance and colour characteristics (as determined using the CIE 1931 system of colour specification). The first comparative coating is a two layer metallic coating. The second comparative coating is a, five layer dielectric coating.

The properties of each of the coatings is as calculated using the commercial software package Tfcalc (Thin Film Design software by Software Spectra Inc, Portland Oreg., USA).

TABLE 3

| Thickness (nm) | 2 layer metallic | 5 layer dielectric | Scratch - masking |
|---|---|---|---|
| Cr | 5 | 0 | 0 |
| $SiO_2$ | 70 | 0 | 50 |
| Material with n = 2.09@550 nm | 0 | 17.8 | 10 |
| $SiO_2$ | 0 | 39.6 | 54.9 |
| Material with n = 2.09@550 nm | 0 | 50.9 | 25.2 |
| Top $SiO_2$ | 0 | 187 | 21.7 |
| R (%) | 7.6 | 15.6 | 13.4 |
| x (CIE1931) | 0.355 | 0.307 | 0.323 |
| y (CIE 1931) | 0.325 | 0.316 | 0.320 |

The term "R" represents the predicted percentage luminosity of the light reflected from the coating. Values x and y represent predicted chromaticity coordinates of the reflected light according to the CIE 1931 system of colour specification.

Superficial scratches of a predetermined depth (nm) were simulated by reducing the thickness of the top layer for each of the described coatings. The resulting reflectance was compared to that of the unscratched surface for each coating. The colour variation as a function of scratch depth is shown in FIG. 3a, where the colour coordinates of the mirror reflection colour are reported in the CIE 1931 colour space, starting from colourless-white (which appears as a black mirror on a dark tinted lens) (0.30<x<0.36, 0.31 <y<0.33), each point representing a 10 nm step increment in the scratch depth.

Figure 3:
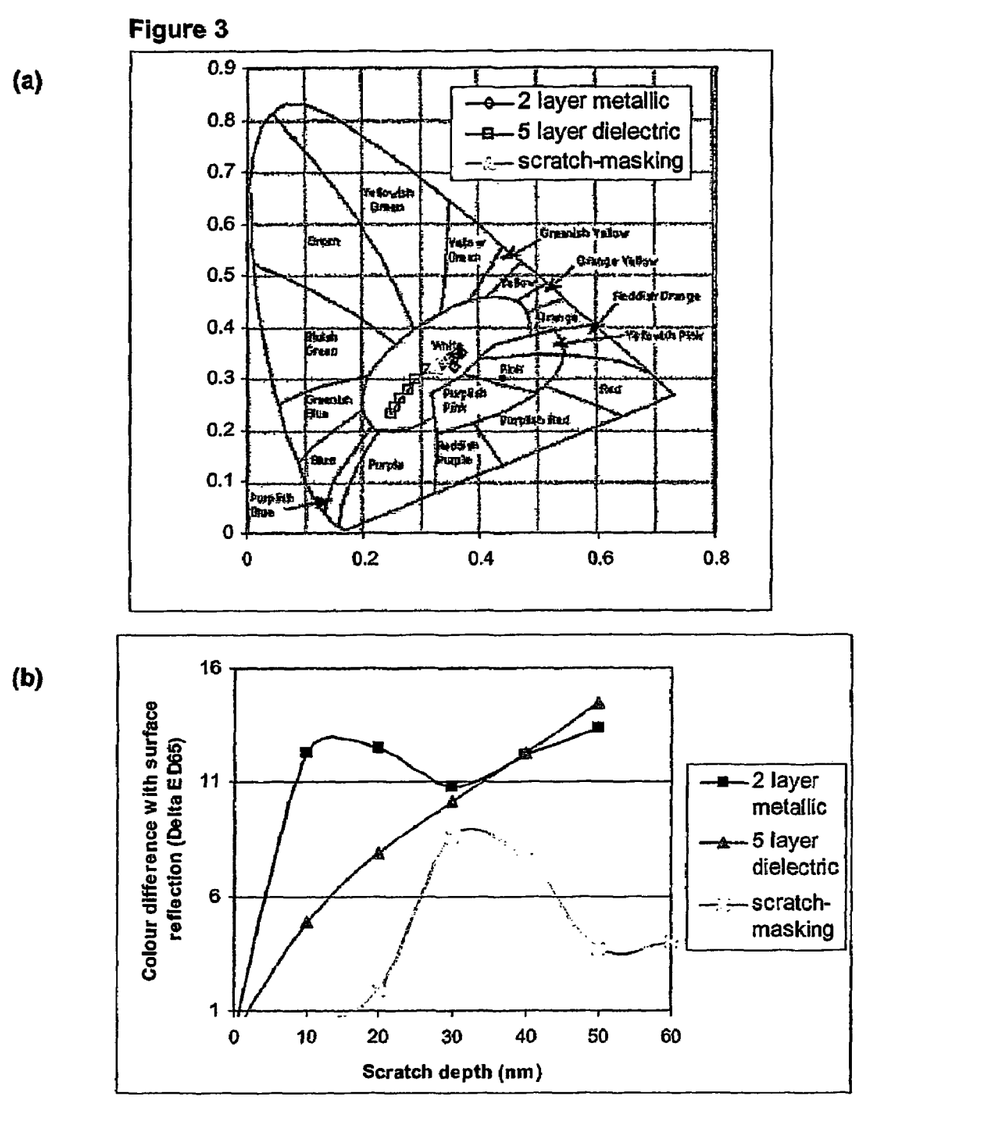
FIG. 3 illustrates the properties of scratch masking coatings as described in Example 3.

As can be seen from FIG. 3a, scratches applied to the comparative two layer coating show a transition from colourless to light pink with increasing scratch depth, while the comparative five layer coating shows a transition from colourless to light blue with increasing scratch depth. There was substantial variation in colour with increasing scratch depth for the comparative five layer coating, with the comparative two layer coating showing less variation than the comparative five layer with increasing scratch depth.

However, to the contrary, for the scratch masking coating the scratches appear colourless over the range of depths from 0 to 50 nm. This results in the visibility of the scratches being reduced as compared to the comparative two layer and five layer coatings. The variation in the colour for the scratch masking coating with increasing scratch depth is minimal and substantially reduced with respect to the comparative two layer coating in particular.

The data of FIG. 3b does not include information on the brightness of colour. To illustrate the colour variation more realistically, the colour difference was calculated using ΔE(CMC 2:1) formula for a D65 illuminant. This system provides a further measure of the ability of the coating to reduce the visibility of scratches. FIG. 3b shows the ΔE values for scratches of differing depths for the scratch masking coating and the comparative two layer and comparative five layer coatings. Colour variations (ΔE) up to a value of 6 are barely noticeable, and colour variations up to 11 are acceptable. As can be seen, scratches of 10 nm in depth or greater had ΔE values greater than 11 for the comparative two layer coating. For the comparative five layer coating, scratches greater than 30 nm in depth showed ΔE values approaching the limit of acceptability. However, the scratch masking coating showed ΔE values of 11 or less for scratches up to and including a depth of 50 nm.

EXAMPLE 4

Table 4 illustrates an example of a scratch resistant, silver reflective (mirror) coating and two comparative coatings with similar reflectance and colour characteristics (as determined using the CIE system of colour specification). The first comparative coating is a two layer metallic coating. The second comparative coating is a two layer dielectric coating.

The properties of each of the coatings is as calculated using the commercial software package Tfcalc (Thin Film Design software by Software Spectra Inc, Portland Oreg., USA).

TABLE 4

| Thickness (nm) | 2 layer metallic | 2 layer dielectric | Scratch - masking |
|---|---|---|---|
| Cr | 5 | 0 | 0 |
| SiO$_2$ | 10 | 91.8 | 20 |
| Material with n = 2.09@550 nm | 0 | 61.4 | 35.7 |
| SiO$_2$ | 0 | 0 | 92.2 |
| Material with n = 2.09@550 nm | 0 | 0 | 48.4 |
| Top SiO$_2$ | 0 | 0 | 50 |
| R (%) | 26.8 | 27.8 | 32.9 |
| x (CIE1931) | 0.322 | 0.323 | 0.301 |
| y (CIE 1931) | 0.322 | 0.331 | 0.327 |

R represents the predicted percentage luminosity of the light reflected from the coating. Values x and y represent predicted chromaticity coordinates of the reflected light according to the CIE 1931 system of colour specification.

Superficial scratches of a predetermined depth (nm) were simulated by reducing the thickness of the top layer for each of the described coatings. The resulting reflectance was compared to that of the unscratched surface for each coating. The colour variation as a function of scratch depth is shown in FIG. 4a, where the colour coordinates of the mirror reflection colour are reported in the CIE 1931 colour space, starting from colourless-white (which appears as a silver mirror on a dark tinted lens when the reflection is typically over 20%) (0.30<x<0.32, 0.32<y<0.33), each point representing a 10 nm step increment in the scratch depth.

Figure 4:
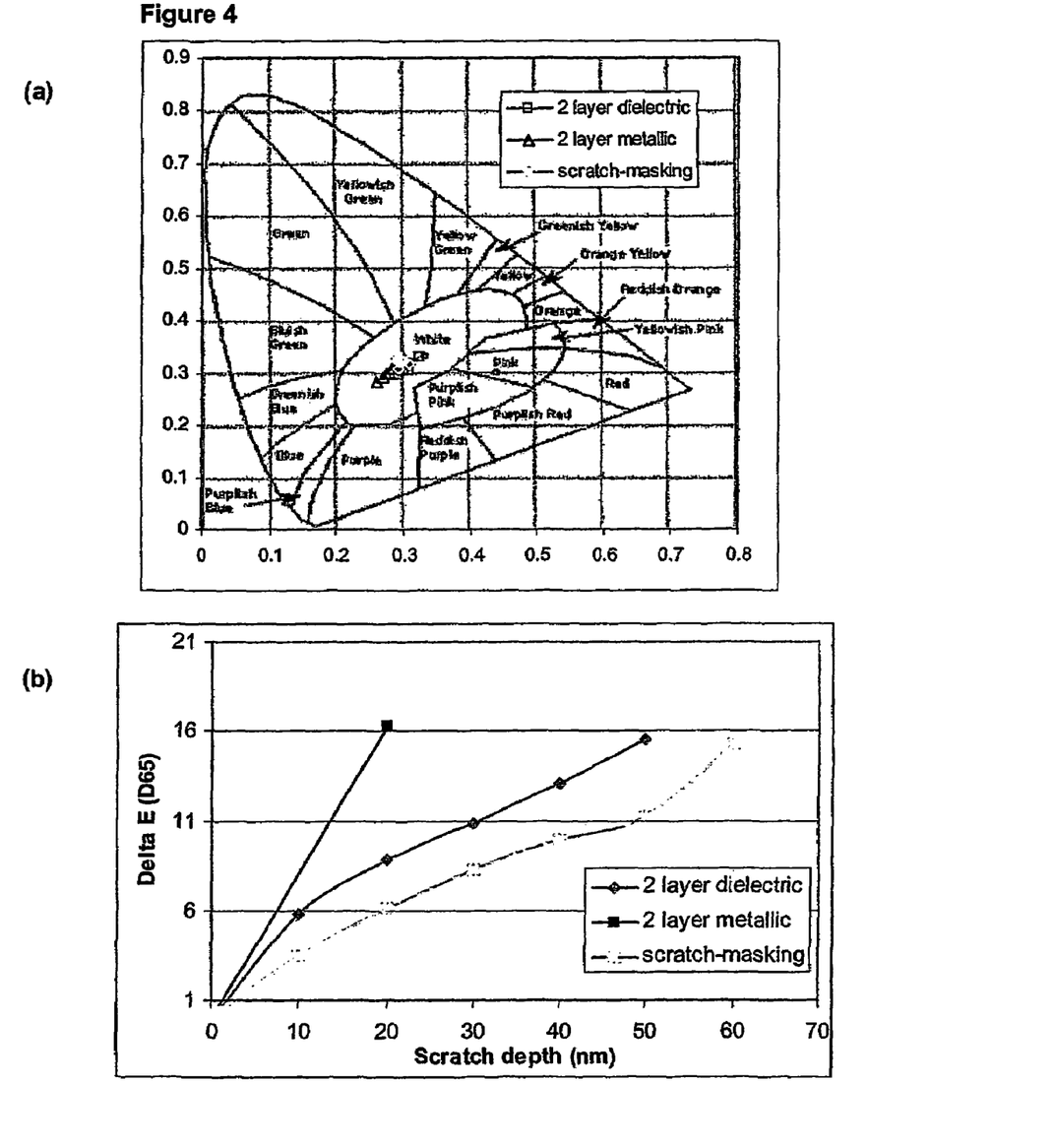
FIG. 4 illustrates the properties of scratch masking coatings as described in Example 4.

As can be seen from FIG. 4a, the colour range for scratches applied to both the comparative two layer coatings is wider than the colour range for scratches applied to the scratch-masking coating. This results in the visibility of the scratches on the scratch masking coating being reduced as compared to the two layer metallic coating and the two layer dielectric coating.

The data of FIG. 4a does not include information on the brightness of colour. To illustrate the colour variation more realistically, the colour difference was calculated using ΔE(CMC 2:1) formula for a D65 (daylight) illuminant. This system provides a further measure of the ability of the coating to reduce the visibility of scratches. FIG. 4b shows the ΔE values for scratches of differing depths for the scratch masking coating and both of the comparative two layer coatings. Colour variations (ΔE) up to a value of 6 are barely noticeable, and colour variations up to 11 are acceptable. As can be seen, scratches of 20 nm in depth or greater had ΔE values greater than 11 for the comparative two layer metallic coating. For the comparative two layer dielectric coating, scratches greater than 30 nm in depth showed ΔE values above the limit of acceptability. However, the scratch masking coating showed ΔE values of 11 or less for scratches up to and including a depth of 50 nm.

EXAMPLE 5

Table 5 illustrates an example of a scratch resistant, bronze reflective (mirror) coating and a comparative two later metallic coating with similar reflectance and colour characteristics (as determined using the CIE 1931 system of colour specification).

The properties of each of the coatings is as calculated using the commercial software package Tfcalc (Thin Film Design software by Software Spectra Inc, Portland Oreg., USA).

TABLE 5

| Thickness (nm) | 2 layer metallic | Scratch - masking |
|---|---|---|
| Cr | 5 | 0 |
| SiO$_2$ | 200 | 0 |
| Material with n = 2.09 @ 550 nm | 0 | 6.3 |
| SiO$_2$ | 0 | 37.0 |
| Material with n = 2.09 @ 550 nm | 0 | 75.9 |
| Top SiO$_2$ | 0 | 36.8 |
| R | 25.9 | 13.7 |
| x (CIE1931) | 0.382 | 0.399 |
| y (CIE 1931) | 0.40 | 0.396 |

The term "R" represents the predicted percentage luminosity of the light reflected from the coating. Values x and y represent predicted chromaticity coordinates of the reflected light according to the CIE 1931 system of colour specification.

Superficial scratches of a predetermined depth (nm) were simulated by reducing the thickness of the top layer for each of the described coatings. The resulting reflectance was compared to that of the unscratched surface for each coating. The colour variation as a function of scratch depth is shown in FIG. 5b, where the colour coordinates of the mirror reflection colour are reported in the CIE 1931 colour space, starting from bronze (0.38<x<0.40, 0.39<y<0.40), each point representing a 10 nm step increment in the scratch depth.

Figure 5:
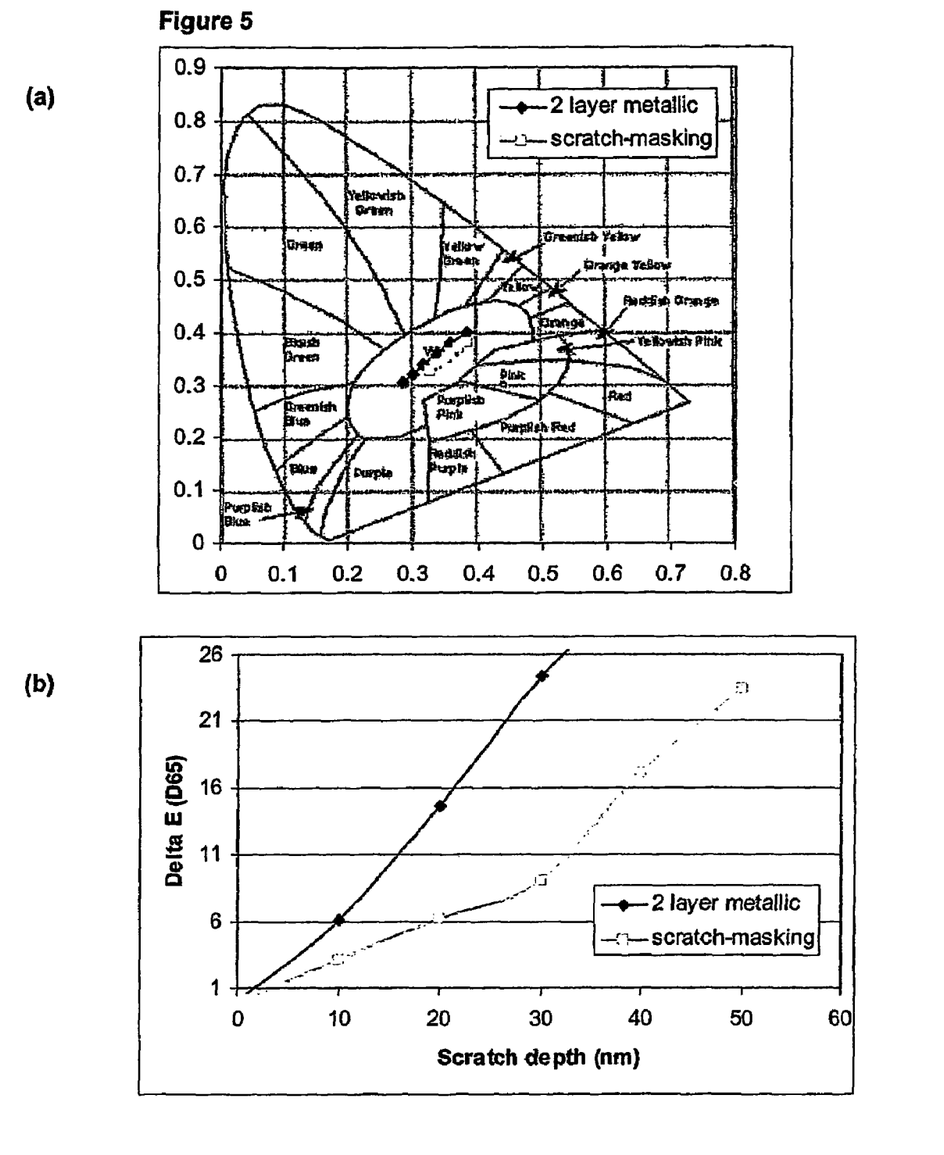
FIG. 5 illustrates the properties of scratch masking coatings as described in Example 5.

As can be seen from FIG. 5a, the colour range for scratches applied to the comparative two layer coating is wider than the colour range for scratches applied to the scratch-masking coating. This demonstrates that the visibility of the scratches on the scratch masking coating are reduced as compared to the comparative two layer metallic coating.

The data of FIG. 5a does not include information on the brightness of colour. To illustrate the colour variation more realistically, the colour difference was calculated using $\Delta E$(CMC 2:1) formula for a D65 illuminant. This system provides a further measure of the ability of the coating to reduce the visibility of scratches. FIG. 5b shows the $\Delta E$ values for scratches of differing depths for the scratch masking coating and the comparative two layer metallic coating. Colour variations ($\Delta E$) up to a value of 6 are barely noticeable, and colour variations up to 11 are acceptable. As can be seen, scratches of 20 nm in depth or greater had $\Delta E$ values greater than 11 for the comparative two layer metallic coating. However, the scratch masking coating showed $\Delta E$ values of 11 or less for scratches up to and including a depth of 30 nm.

EXAMPLE 6

The scratch masking coatings described in Examples 1 to 5 were deposited experimentally on hardcoated CR39 lenses using ion-assisted evaporation.

Table 6 illustrates the structure and composition of each of these scratch-masking mirror coatings.

TABLE 6

| Thickness (nm) | Sky Blue | Black | Silver | Bronze | Night Blue |
|---|---|---|---|---|---|
| $SiO_2$ | 48.2 | 50 | 20 | 0 | 0 |
| n = 2.09@550 nm | 164.8 | 10 | 35.7 | 6.3 | 37 |
| $SiO_2$ | 117.3 | 54.9 | 92.2 | 37 | 57 |
| n = 2.09@550 nm | 146.6 | 25.2 | 48.4 | 75.9 | 178 |
| Top $SiO_2$ | 327.7 | 21.7 | 50 | 36.8 | 317 |

Two further comparative coatings were also tested. The first comparative coating was a two layer metallic Sky Blue mirror coating deposited on a similar lens with ion beam deposition. The second comparative coating was a two layer metallic Sky Blue mirror coating deposited on a similar lens without ion beam assistance.

To test the abrasion resistance of each of the mirror coatings, Steel Wool tests were performed by rubbing a Steelwool pad under a constant charge for 75 cycles. The surface damage to each coating was visually assessed and given a star ratio according to test standards (5 ✭=almost no scratches; 0 ✭=heavily scratched)

The abrasion resistance for each of the scratch masking coatings, and the abrasion resistance of both the comparative two layer metallic coatings, as determined by averaging of the results of the tests for at least 2 lenses, is shown in Table 7:

TABLE 7

|  | Steelwool |
|---|---|
| Scratch-masking Sky Blue | ✭✭✭✭✭ |
| Scratch-masking Black | ✭✭✭✭ |
| Scratch-masking Bronze | ✭✭✭✭ |
| Scratch-masking Silver | ✭✭✭ |
| Scratch-masking Night Blue | ✭✭✭ |
| 2 layer metallic black mirror (with ion-assistance) | ✭ |
| 2 layer metallic black mirror (without ion-assistance) | ✭ |

The results obtained using the Steelwool test show that the scratch masking mirror coatings have good to excellent abrasion resistance, and each coating was significantly improved over both the comparative two layer metallic coatings. Surface damage to the scratch masking mirror coatings after the Steelwool test is barely visible. Scratch masking mirrors are significantly more wear resistant than the comparative two layer metallic mirror coatings.

Figure 6:
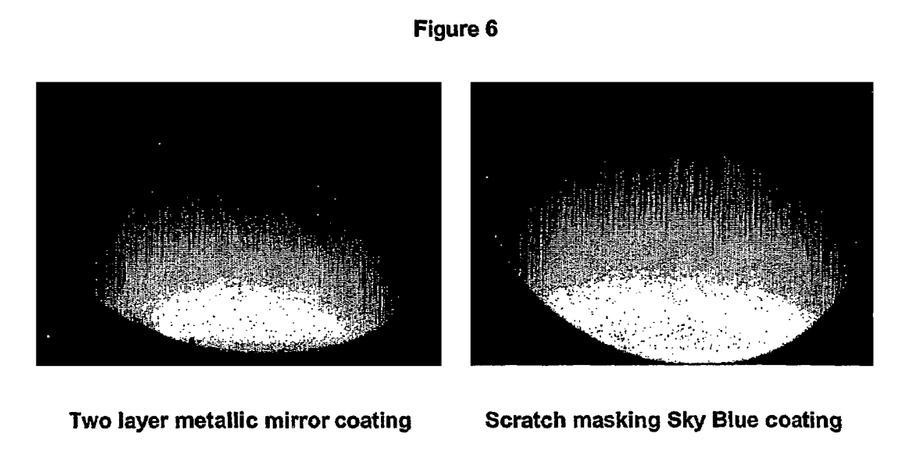
FIG. 6 illustrates the damage following 75 cycles of the Steelwool test to a standard two layer metallic mirror coating deposited with ion assistance, as compared to the damage to a scratch masking Sky Blue mirror deposited with ion assistance, as described in Example 6.

As expected, the scratches applied to the scratch-masking coatings did not exhibit any significant colour changes. However, the scratches applied to both the 2 layer mirrors did exhibit noticeable colour changes. This difference is illustrated in FIG. 6 for the case of scratches resulting after the Steelwool test to the scratch masking sky blue mirror coating, as compared to the scratches applied to the comparative 2 layer metallic sky blue mirror coating. Scratches to the comparative 2 layer metallic coating are yellow in colour and therefore highly visible. However, scratches to the scratch masking sky blue coating are blue and therefore less visible.

Finally, it will be appreciated that there may be other variations and modifications to the methods described herein that are also within the scope of the present invention.

The invention claimed is:

1. A reflective coating for a surface of an optical substrate, the reflective coating including a plurality of layers of alternating higher and lower refractive index, the thickness or number of the layers or both being selected to cause the reflective coating to be scratch masking.

2. A reflective coating according to claim 1, wherein the variation in reflected colour shift ($\Delta E$) of the reflective coating when scratched is 11 or less.

3. A reflective coating according to claim 1, wherein the variation in reflected colour shift ($\Delta E$) of the reflective coating when scratched is 6 or less.

4. A reflective coating according to claim 1, wherein the variation in the chromaticity coordinates of the light reflected from the reflective coating when scratched is substantially unchanged.

5. A reflecting coating according to claim 1, wherein the refractive index of the layer or layers of lower refractive index is in the range 1.40–1.50.

6. A reflective coating according to claim 5, wherein the refractive index of the layer or layers of lower refractive index is 1.45.

7. A reflective coating according to claim 1, wherein the refractive index of the layer or layers of higher refractive index is in the range 1.90 to 2.50.

8. A reflective coating according to claim 7, wherein the refractive index of the layer or layers of higher refractive index is 2.09.

9. A reflective coating according to claim 1, wherein the reflective coating includes four or more layers of alternating higher and lower refractive index.

10. A reflective coating according to claim 9, wherein the reflective coating consists of 4 layers of alternating higher and lower refractive index.

11. A reflective coating according to claim 9, wherein the reflective coating consists of 5 layers of alternating higher and lower refractive index.

12. A reflective coating according to claim 1, wherein the layers are formed from one or more optically suitable dielectric materials.

13. A reflective coating according to claim 12, wherein the dielectric material is a metal oxide, a metalfluoride, a metal nitride or diamond-like carbon.

14. A reflective coating according to claim 13, wherein the dielectric material is selected from the group consisting of $Al_2O_3$, $BaTiO_3$, $Bi_2O_3$, $CeO_2$, $Cr_2O_3$, $Ga_2O_3$, $GeO_2$, $Fe_2O_3$, $HfO_2$, $In_2O_3$, indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O_3$, ZnO, $ZrO_2$, $AlF_3$, $BaF_2$, $CaF_2$, $CdF_2$, $CeF_3$, $HfF_4$, $LaF_3$, LiF, $MgF$, NaF, $Na_3AlF_6$, $Na_5Al_3F_6$, $NdF_3$, $PbF_2$, $PrF_3$, $SrF_2$, $ThF_4$, $ZrF_4$, $Si_3N_4$, and AlN.

15. A reflective coating according to claim 1, wherein the layer or layers of lower refractive index include $SiO_2$.

16. A reflective coating according to claim 1, wherein the layer or layers of higher refractive index include $TiO_2$ or a combination of $TiO_2$ and $Pr_2O_3$.

17. A reflective coating according to claim 15, wherein the layer or layers of higher refractive index include $TiO_2$ or a combination of $TiO_2$ and $Pr_2O_3$.

18. A reflective coating according to claim 1, wherein the reflective coating is formed by vacuum deposition, physical vapour deposition, or chemical vapour deposition.

19. A reflective coating according to claim 18, wherein the reflective coating is formed by physical vapour deposition.

20. A reflective coating according to claim 1, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating.

21. A reflective coating according to claim 20, wherein the additional coating is an abrasion resistant coating.

22. A reflective coating according to claim 21, wherein the abrasion resistant coating is deposited by chemical vapour deposition.

23. A reflective coating according to claim 22, wherein the abrasion resistant coating is deposited by low temperature plasma enhanced chemical vapour deposition.

24. A reflective coating according to claim 21, wherein the abrasion resistant coating includes a siloxane resin with colloidal silica.

25. A reflective coating according to claim 21, wherein the abrasion resistant coating underlies the reflective coating.

26. A reflective coating according to claim 20, wherein the additional coating is a hydrophobic coating.

27. A reflective coating for a surface of an optical substrate, the reflective coating including a plurality of layers of alternating higher and lower refractive index, the thickness or number of the layers or both being selected to cause the reflective coating to be scratch masking, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating wherein the hydrophobic coating includes a fluorine polysilazine.

28. A reflective coating according to claim 26, wherein the hydrophobic coating overlies the reflective coating.

29. A reflective coating according to claim 1 wherein a surface of the optical substrate is subjected to a surface treatment to improve bondability or compatability or both.

30. A reflective coating according to claim 29, wherein the surface treatment is selected from one or more of the group consisting of plasma radiation, UV radiation, flame treatment, ion pre-cleaning and laser treatment, including excimer laser treatment.

31. A reflective coating according to claim 1, wherein the reflective coating shows improved resistance to abrasion as compared to a non-scratch masking coating with similar reflectance and colour characteristics.

32. An optical substrate having a reflective coating on a surface thereof, the reflective coating including a plurality of layers of alternating higher and lower refractive index, the thickness or number of the layers or both being selected to cause the reflective coating to be scratch masking.

33. An optical substrate according to claim 32, wherein the variation in reflected colour shift ($\Delta E$) of the reflective coating when scratched is 11 or less.

34. An optical substrate according to claim 32, wherein the variation in reflected colour shift ($\Delta E$) of the reflective coating when scratched is 6 or less.

35. An optical substrate according to claim 32, wherein the variation in the chromaticity coordinates of the light reflected from the reflective coating when scratched is substantially unchanged.

36. An optical substrate according to claim 32, wherein the refractive index of the layer or layers of lower refractive index is in the range 1.40–1.50.

37. An optical substrate according to claim 36, wherein the refractive index of the layer or layers of lower refractive index is 1.45.

38. An optical substrate according to claim 32, wherein the refractive index of the layer or layers of higher refractive index is in the range 1.90 to 2.50.

39. An optical substrate according to claim 38, wherein the refractive index of the layer or layers of higher refractive index is 2.09.

40. An optical substrate according to claim 32, wherein the reflective coating includes four or more layers of alternating higher and lower refractive index.

41. An optical substrate according to claim 40, wherein the reflective coating consists of 4 layers of alternating higher and lower refractive index.

42. An optical substrate according to claim 40, wherein the reflective coating consists of 5 layers of alternating higher and lower refractive index.

43. An optical substrate according to claim 32, wherein the layers are formed from one or more optically suitable dielectric materials.

44. An optical substrate according to claim 43, wherein the dielectric material is a metal oxide, a metal fluoride, a metal nitride or diamond-like carbon.

45. An optical substrate according to claim 44, wherein the dielectric material is selected from the group consisting of $Al_2O_3$, $BaTiO_3$, $Bi_2O_3$, $CeO_2$, $Cr_2O_3$, $Ga_2O_3$, $GeO_2$, $Fe_2O_3$, $HfO_2$, $In_2O_3$, indium-tin oxide, $La_2O_3$, MgO, $Nd_2O_3$, $Nb_2O_5$, $Pr_2O_3$, $Sb_2O_3$, $Sc_2O_3$, SiO, $SiO_2$, $SnO_2$, $Ta_2O_5$, TiO, $TiO_2$, $Ti_2O_3$, $Ti_3O_5$, $WO_3$, $Y_2O_3$, $Yb_2O_3$, ZnO, $ZrO_2$, $AlF_3$, $BaF_2$, $CaF_2$, $CdF_2$, $CeF_3$, $HfF_4$, $LaF_3$, LiF, $MgF$, NaF, $Na_3AlF_6$, $Na_5Al_3F_6$, $NdF_3$, $PbF_2$, $PrF_3$, $SrF_2$, $ThF_4$, $ZrF_4$, $Si_3N_4$, and AlN.

46. An optical substrate according to claim 32, wherein the layer or layers of lower refractive index include $SiO_2$.

47. An optical substrate according to claim 32, wherein the layer or layers of higher refractive index include $TiO_2$ or a combination of $TiO_2$ and $Pr_2O_3$.

48. An optical substrate according to claim 46, wherein the layer or layers of higher refractive index include $TiO_2$ or a combination of $TiO_2$ and $Pr_2O_3$.

49. An optical substrate according to claim 32, wherein the reflective coating is formed by vacuum deposition, physical vapour deposition, or chemical vapour deposition.

50. An optical substrate according to claim 49, wherein the reflective coating is formed by physical vapour deposition.

51. An optical substrate according to claim 32, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating.

52. An optical substrate according to claim 51, wherein the additional coating is an abrasion resistant coating.

53. An optical substrate according to claim 52, wherein the abrasion resistant coating is deposited by chemical vapour deposition.

54. An optical substrate according to claim 53, wherein the abrasion resistant coating is deposited by low temperature plasma enhanced chemical vapour deposition.

55. An optical substrate according to claim 52, wherein the abrasion resistant coating includes a siloxane resin with colloidal silica.

56. An optical substrate according to claim 52, wherein the abrasion resistant coating underlies the reflective coating.

57. An optical substrate according to claim 51, wherein the additional coating is a hydrophobic coating.

58. An optical substrate having a reflective coating on a surface thereof, the reflective coating including a plurality of layers of alternating higher and lower refractive index, the thickness or number of the layers or both being selected to cause the reflective coating to be scratch masking, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating, wherein the hydrophobic coating includes a fluorine polysilazine.

59. An optical substrate according to claim 57, wherein the hydrophobic coating overlies the reflective coating.

60. An optical substrate according to claim 32, wherein a surface of the optical substrate is subjected to a surface treatment to improve bondability or compatability or both.

61. An optical substrate according to claim 60, wherein the surface treatment is selected from one or more of the group consisting of plasma radiation, UV radiation, flame treatment, ion pre-cleaning and laser treatment, including excimer laser treatment.

62. An optical substrate according to claim 32, wherein the reflective coating shows improved resistance to abrasion as compared to a non-scratch masking coating with similar reflectance and colour characteristics.

63. A method for forming a reflective coating on a surface of an optical substrate, the method including the step of depositing a reflective coating including a plurality of layers of alternating higher and lower refractive index, the thickness or number of the layers or both being selected to cause the reflective coating to be scratch masking.

64. A method according to claim 63, wherein the variation in reflected colour shift ($\Delta E$) of the reflective coating when scratched is 11 or less.

65. A method according to claim 63, wherein the variation in reflected colour shift ($\Delta E$) of the reflective coating when scratched is 6 or less.

66. A method according to claim 63, wherein the variation in the chromaticity coordinates of the light reflected from the reflective coating when scratched is substantially unchanged.

67. A method according to claim 63, wherein the refractive index of the layer or layers of lower refractive index is in the range 1.40–1.50.

68. A method according to claim 67, wherein the refractive index of the layer or layers of lower refractive index is 1.45.

69. A method according to claim 63, wherein the refractive index of the layer or layers of higher refractive index is in the range 1.90 to 2.50.

70. A method according to claim 69, wherein the refractive index of the layer or layers of higher refractive index is 2.09.

71. A method according to claim 63, wherein the reflective coating includes four or more layers of alternating higher and lower refractive index.

72. A method according to claim 71, wherein the reflective coating consists of 4 layers of alternating higher and lower refractive index.

73. A method according to claim 71, wherein the reflective coating consists of 5 layers of alternating higher and lower refractive index.

74. A method according to claim 63, wherein the layers are formed from one or more optically suitable dielectric materials.

75. A method according to claim 74, wherein the dielectric material is a metal oxide, a metal fluoride, a metal nitride or diamond-like carbon.

76. A method according to claim 75, wherein the dielectric material is selected from the group consisting of $Al_2O_3$, $BaTiO_3$, $Bi_2O_3$, $CeO_2$, $Cr_2O_3$, $Ga_2O_3$, $GeO_2$, $Fe_2O_3$, $HfO_2$, $In_2O_3$, indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $Ti_2O_3$, $Ti_3O_5$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF$, $NaF$, $Na_3AlF_6$, $Na_5Al_3F_6$, $NdF_3$, $PbF_2$, $PrF_3$, $SrF_2$, $ThF_4$, $ZrF_4$, $Si_3N_4$, and $AlN$.

77. A method according to claim 63, wherein the layer or layers of lower refractive index include $SiO_2$.

78. A method according to claim 63, wherein the layer or layers of higher refractive index include $TiO_2$ or a combination of $TiO_2$ and $Pr_2O_3$.

79. A method according to claim 77, wherein the layer or layers of higher refractive index include $TiO_2$ or a combination of $TiO_2$ and $Pr_2O_3$.

80. A method according to claim 63, wherein the reflective coating is formed by vacuum deposition, physical vapour deposition, or chemical vapour deposition.

81. A method according to claim 80, wherein the reflective coating is formed by physical vapour deposition.

82. A method according to claim 63, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating.

83. A method according to claim 82, wherein the additional coating is an abrasion resistant coating.

84. A method according to claim 82, wherein the abrasion resistant coating is deposited by chemical vapour deposition.

85. A method according to claim 84, wherein the abrasion resistant coating is deposited by low temperature plasma enhanced chemical vapour deposition.

86. A method according to claim 83, wherein the abrasion resistant coating includes a siloxane resin with colloidal silica.

87. A method according to claim 83, wherein the abrasion resistant coating underlies the reflective coating.

88. A method according to claim 82, wherein the additional coating is a hydrophobic coating.

89. A method for forming a reflective coating on a surface of an optical substrate, the method including the step of depositing a reflective coating including a plurality of layers of alternating higher and lower refractive index, the thickness or number of the layers or both being selected to cause the reflective coating to be scratch masking, wherein the optical substrate further includes one or more additional coatings selected from the group consisting of an abrasion resistant coating, an impact resistant coating, an adhesion promoting coating, a hydrophobic coating, an oleophobic coating, and a hydrophilic coating, wherein the hydrophobic coating includes a fluorine polysilazine.

90. A method according to claim 88, wherein the hydrophobic coating overlies the reflective coating.

91. A method according to claim 63, wherein a surface of the optical substrate is subjected to a surface treatment to improve bondability or compatability or both.

92. A method according to claim 91, wherein the surface treatment is selected from one or more of the group consisting of plasma radiation, UV radiation, flame treatment, ion pre-cleaning and laser treatment, including excimer laser treatment.

93. A method according to claim 63, wherein the reflective coating shows improved resistance to abrasion as compared to a non-scratch masking coating with similar reflectance and colour characteristics.

94. A reflective coating according to claim 1, wherein the optical substrate is an ophthalmic lens or a sunglass lens.

95. An optical substrate according to claim 32, wherein the optical substrate is an ophthalmic lens or sunglass lens.

96. A method according to claim 63, wherein the optical substrate is an ophthalmic lens or a sunglass lens.

* * * * *